US010355945B2

(12) United States Patent
Chan et al.

(10) Patent No.: US 10,355,945 B2
(45) Date of Patent: Jul. 16, 2019

(54) SERVICE LEVEL MANAGEMENT OF A WORKLOAD DEFINED ENVIRONMENT

(71) Applicant: INTERNATIONAL BUSINESS MACHINES CORPORATION, Armonk, NY (US)

(72) Inventors: Yuk L. Chan, Rochester, NY (US); Andrew P. Wack, Millbrook, NY (US); Peter B. Yocom, LaGrangeville, NY (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 178 days.

(21) Appl. No.: 15/271,770

(22) Filed: Sep. 21, 2016

(65) Prior Publication Data
US 2018/0083845 A1 Mar. 22, 2018

(51) Int. Cl.
H04L 12/24 (2006.01)
H04L 12/26 (2006.01)
(52) U.S. Cl.
CPC ...... H04L 41/5019 (2013.01); H04L 41/5032 (2013.01); H04L 43/0817 (2013.01)
(58) Field of Classification Search
CPC .................................................. H04L 41/5019
See application file for complete search history.

(56) References Cited

U.S. PATENT DOCUMENTS

| 7,646,725 | B1* | 1/2010 | Soukup | H04L 41/5003 370/252 |
| 7,788,040 | B2* | 8/2010 | Haskell | G16H 10/60 702/19 |
| 8,645,529 | B2 | 2/2014 | Doddavula | |
| 9,032,344 | B2 | 5/2015 | Chene | |
| 9,292,336 | B1* | 3/2016 | Ramalingam | G06Q 10/04 |
| 9,348,724 | B2* | 5/2016 | Ota | G06F 9/45558 |

(Continued)

FOREIGN PATENT DOCUMENTS

| CN | 101826025 A | 9/2010 |
| CN | 103885771 A | 6/2014 |
| CN | 104881666 A | 9/2015 |

OTHER PUBLICATIONS

Dayal et al., "I/O Containers: Managing the Data Analytics and Visualization Pipelines of High End Codes", 2013 (Year: 2013).*

(Continued)

Primary Examiner — Ondrej C Vostal
(74) Attorney, Agent, or Firm — Cantor Colburn LLP; William Kinnaman

(57) ABSTRACT

Examples of techniques for service level management of a workload defined environment are disclosed. In one example implementation according to aspects of the present disclosure, a computer-implemented method may include: collecting runtime workload data for a workload executing within a container; performing, by a processing device, a determination of whether the runtime workload data satisfies a goal set forth in a service level agreement; responsive to determining that the runtime workload data does not satisfy the goal, providing data from within the container in a format utilized by an application program interface; and accessing the data from within the container through the application program interface from outside of the container.

20 Claims, 7 Drawing Sheets

(56) References Cited

U.S. PATENT DOCUMENTS

| | | | | |
|---|---|---|---|---|
| 9,356,883 | B1* | 5/2016 | Borthakur | H04L 41/5025 |
| 9,367,379 | B1* | 6/2016 | Burke | G06F 9/546 |
| 9,614,972 | B2* | 4/2017 | Ballai | H04W 12/12 |
| 9,864,636 | B1* | 1/2018 | Patel | G06F 9/5061 |
| 10,021,008 | B1* | 7/2018 | Pai | H04L 43/0876 |
| 2002/0038340 | A1* | 3/2002 | Whipple | G06F 9/465 |
| | | | | 709/203 |
| 2004/0243692 | A1* | 12/2004 | Arnold | G06F 9/5016 |
| | | | | 709/220 |
| 2005/0216585 | A1* | 9/2005 | Todorova | H04L 41/22 |
| | | | | 709/224 |
| 2005/0216860 | A1* | 9/2005 | Petrov | H04L 41/22 |
| | | | | 715/810 |
| 2008/0082983 | A1* | 4/2008 | Groetzner | G06F 9/5083 |
| | | | | 718/105 |
| 2008/0270199 | A1* | 10/2008 | Chess | G06F 9/505 |
| | | | | 705/7.26 |
| 2010/0042450 | A1 | 2/2010 | Binswanger et al. | |
| 2010/0180275 | A1* | 7/2010 | Neogi | G06F 1/3203 |
| | | | | 718/1 |
| 2011/0258634 | A1* | 10/2011 | Bonilla | G06F 9/505 |
| | | | | 718/105 |
| 2012/0096093 | A1* | 4/2012 | Bouw | G06F 9/5061 |
| | | | | 709/206 |
| 2014/0137104 | A1* | 5/2014 | Nelson | G06F 9/45558 |
| | | | | 718/1 |
| 2014/0137107 | A1* | 5/2014 | Banerjee | G06F 1/3234 |
| | | | | 718/1 |
| 2014/0317265 | A1* | 10/2014 | James | H04L 67/1004 |
| | | | | 709/224 |
| 2015/0058863 | A1* | 2/2015 | Karamanolis | G06F 9/5083 |
| | | | | 718/105 |
| 2015/0146675 | A1* | 5/2015 | Zhang | H04L 41/082 |
| | | | | 370/329 |
| 2015/0205714 | A1 | 7/2015 | Greenfield et al. | |
| 2015/0281018 | A1* | 10/2015 | Britt | G06F 17/30477 |
| | | | | 707/769 |
| 2015/0309789 | A1 | 10/2015 | Thorat | |
| 2015/0363133 | A1* | 12/2015 | Bobroff | G06F 9/45529 |
| | | | | 711/170 |
| 2016/0036886 | A1* | 2/2016 | Ito | H04L 65/605 |
| | | | | 709/219 |
| 2016/0048391 | A1 | 2/2016 | Somani et al. | |
| 2016/0171611 | A1* | 6/2016 | Sheng | H04L 63/0807 |
| | | | | 705/51 |
| 2016/0191343 | A1* | 6/2016 | Dong | G06F 9/5083 |
| | | | | 709/226 |
| 2016/0232502 | A1* | 8/2016 | Barbulescu | G06Q 20/108 |
| 2017/0060653 | A1* | 3/2017 | Nandakumar | G06F 11/079 |
| 2017/0083386 | A1* | 3/2017 | Wing | G06F 9/542 |
| 2017/0090987 | A1* | 3/2017 | Hearn | G06F 9/4881 |
| 2017/0353397 | A1* | 12/2017 | Che | H04L 67/10 |
| 2018/0083632 | A1 | 3/2018 | Chan et al. | |
| 2018/0159746 | A1* | 6/2018 | Li | H04L 41/5016 |

OTHER PUBLICATIONS

Garcia et al., "SLA-driven dynamic cloud resource management", 2012 (Year: 2012).*

Microsoft Computer Dictionary, "container", 5th edition, 2002, p. 125 (Year: 2002).*

Tosatto et al., "Container-based orchestration in cloud: state of the art and challenges", 2015 (Year: 2015).*

List of IBM Patents or Patent Applications Treated as Related; POU920160342US1, Date Filed; Oct. 21, 2016, p. 1-2.

Yuk L. Chan, et al., "Managing Workload Distribution Among Processing Systems Based on Field Programmable Devices" U.S. Appl. No. 15/271,753, filed Sep. 21, 2016.

Yuk L. Chan, et al.,"Deploying and Utilizing a Software Library and Corresponding Field Programmable Device Binary", U.S. Appl. No. 15/271,789, filed Sep. 21, 2016.

Yuk L. Chan, et al., "Deploying and Utilizing a Software Library and Corresponding Field Programmable Device Binary", U.S. Appl. No. 15/271,742 , filed Sep. 21, 2016.

Yuk L. Chan, et al.,"Enabling a Field Programmable Device On-Demand", U.S. Appl. No. 15/271,720, filed Sep. 21, 2016.

Yuk L. Chan, et al.,"Reprogramming a Field Programmable Device On-Demand", U.S. Appl. No. 15/271,728, filed Sep. 21, 2016.

Yuk L. Chan, et al.,"Resource Sharing Management of a Field Programmable Device", U.S. Appl. No. 15/271,780, filed Sep. 21, 2016.

Yuk L. Chan, et al.,"Service Level Management of a Workload Defined Environment", U.S. Appl. No. 15/271,760, filed Sep. 21, 2016.

M. Lin, et al.,"OpenRCL: Low-Power High-Performance Computing with Reconfigurable Devices", International Conference on Filed Programmable Logic and Applications, 2010, p. 1-6.

List of IBM Patents or Patent Applications Treated as Related; POU920160148US2, Date Filed: Apr. 24, 2017, p. 1-2.

* cited by examiner

SERVICE LEVEL MANAGEMENT OF A WORKLOAD DEFINED ENVIRONMENT

BACKGROUND

The present application generally relates to software defined environments and, more particularly, to service level management of a workload defined environment.

Software defined environments are defined surrounding different elements of the infrastructure. For example, software defined storage defines and manages a storage solution using a set of storage policies. In one such example where an edge data center is used to manage traffic for ten city blocks, the edge data center collects data from the automobile for traction, exhaust, speed, model, make, tire wear, etc. Then, the edge data center analyzes this data for icy conditions, for example, and notifies other cars of the icy conditions. In this scenario, the edge data center stores a massive amount of data, and there may be many of these edge data centers being utilized. In addition, a similar solution could be implemented in a different city, for example. These edge data centers could be using hardware from different manufacturers, could be of a different generation or capability of hardware, and/or could process different amount of works (e.g., some might have more capability than others).

In another example, an insurance company may be studying icy road conditions, accident rate, and drivers' habits relating thereto. The insurance company could deploy a container (e.g., a docker container) to these distributed edge data centers deployed in the city example above. These containers contain logic/software that collects and analyzes the data and sends the results of the analysis to the insurance company.

SUMMARY

According to examples of the present disclosure, techniques including methods, systems, and/or computer program products for service level management of a workload defined environment are provided. An example method may include: collecting runtime workload data for a workload executing within a container; performing, by a processing device, a determination of whether the runtime workload data satisfies a goal set forth in a service level agreement; responsive to determining that the runtime workload data does not satisfy the goal, providing data from within the container in a format utilized by an application program interface; and accessing the data from within the container through the application program interface from outside of the container.

Additional features and advantages are realized through the techniques of the present disclosure. Other aspects are described in detail herein and are considered a part of the disclosure. For a better understanding of the present disclosure with the advantages and the features, refer to the following description and to the drawings.

BRIEF DESCRIPTION OF THE DRAWINGS

The subject matter which is regarded as the invention is particularly pointed out and distinctly claimed in the claims at the conclusion of the specification. The foregoing and other features, and advantages thereof, are apparent from the following detailed description taken in conjunction with the accompanying drawings in which:

DETAILED DESCRIPTION

Figure 1:
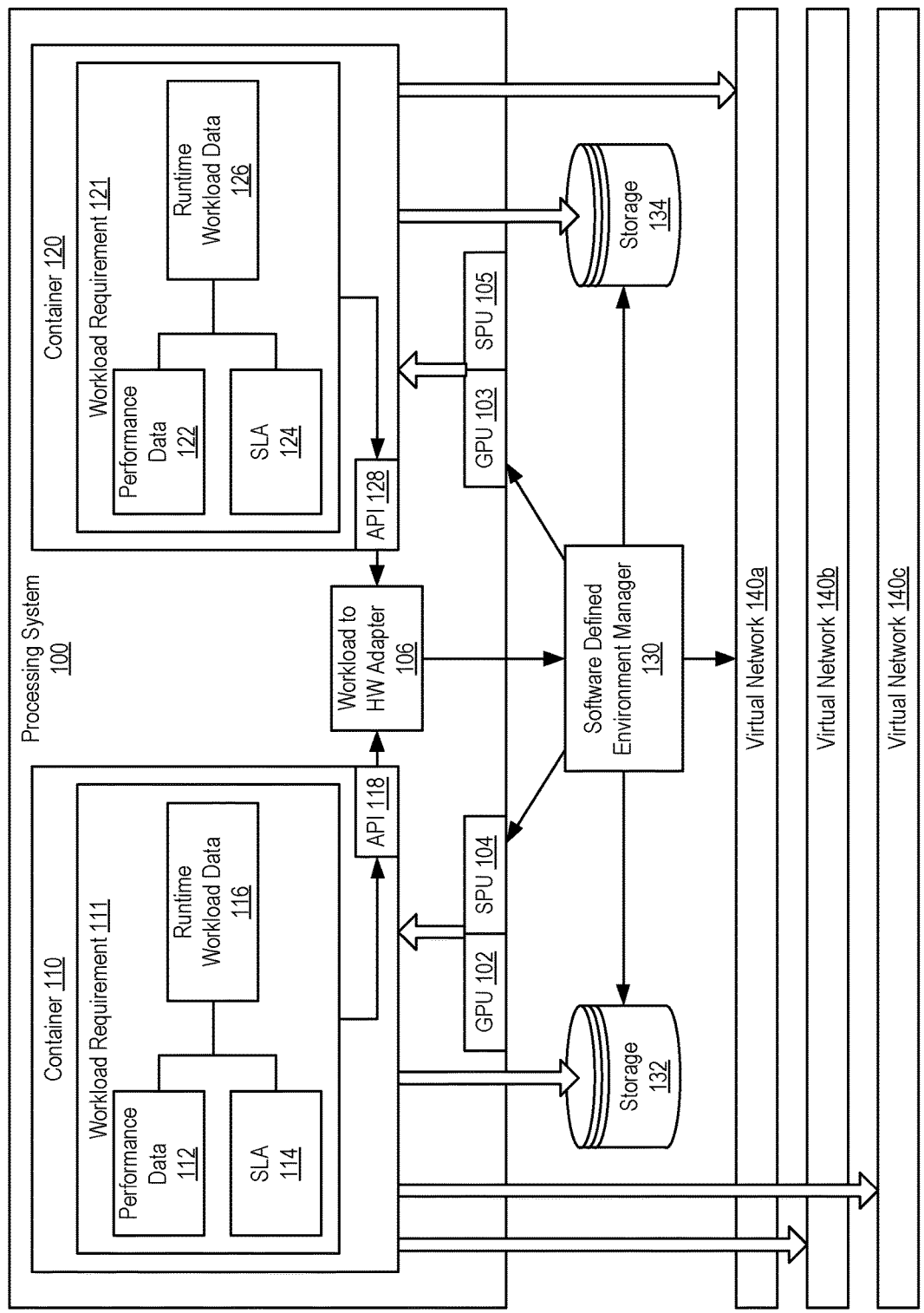
FIG. 1 illustrates a block diagram of processing system comprising containers each having workload requirements associated therewith according to examples of the present disclosure.

The present techniques provide for a container that contains a service level agreement (SLA) centering on a workload. The container communicates the workload requirement to the underlying infrastructure and influences the software defined environment underneath it. The present techniques provide an inside-out, workload oriented approach to define the software defined environment. Containers may include different technologies that provide an abstraction of physical resources, for example, a virtual server, a docker container, a workload container, a logical partitioning (LPAR) from a system Z, a virtual machine on z/VM, a virtual server running on another virtual server that runs on physical hardware.

In a traditional virtual server or virtual cloud implementation, the resource requirement of the virtual server or virtual cloud is defined for a virtual server as number of processing units, amount of memory, etc. These attributes are defined using conditions defined by the underlying software defined environment and are added to the software defined environment directly.

In the workload defined environment provided herein, the SLA requirement of a workload is defined surrounding the workload itself using workload based terms, such as wall clock response time, queue size, etc. When a workload is deployed to different environments, the container negotiates with the underlying software defined environment for its requirements. The workload does not know or understand these requirements and/or the hardware specification of the underlying environment.

In particular, the present techniques define SLA static workload characteristics and provide runtime attributes within a hardware agnostic container. These characteristics are translated to the environment specific criteria by a translation module, and incorporated into the software defined environment (i.e., a non-hardware agnostic environment). In addition, the workload container is responsible for determining and communicating its runtime requirements based on the SLA to a software defined environment manager.

In some implementations, the present techniques include or yield various technical features, technical effects, and/or improvements to technology. For instance, examples of the present disclosure provide the technical effect of using workload data to cause a performance adjustment to a processing system. Moreover, the present disclosure improves the functioning of the processing system by enabling performance adjustments to resources of the processing system (e.g., increasing a number of processors, increasing available memory, etc.).

These technical effects are achieved as a result of the technical features of determining whether runtime workload data satisfies a goal set forth in a service level agreement. This ensures that resources of the processing system are being used to satisfy service level agreement goals. As a result of these technical features and technical effects, example embodiments of the disclosure constitute an improvement to existing computing resource management technology. It should be appreciated that the above examples of technical features, technical effects, and improvements to the technology of example embodiments of the disclosure are merely illustrative and not exhaustive. These and other advantages will be apparent from the description that follows.

FIG. 1 illustrates a block diagram of processing system 100 comprising containers 110, 120 each having workload requirements 111, 121 respectively according to examples of the present disclosure. In particular, a workload is associated with each of the containers 110, 120. The workload requirement 111, 121 defines a "goal" and a criterion for meeting the goal. In an example embodiment, a workload implements an application program interface (API) 118 that returns a "yes" or "no" when determining whether a goal is met. The algorithm used in the API 118 is workload specific. For example, the API 118 keeps statistics of queue time for a web server request and determines the average queue time. For a goal of a queue time being less than 15 seconds, if the average queue time is greater than 15 seconds, for example, then the workload goal was not met and a "no" is returned. If, however, the average queue time is less than or equal to 15 seconds, then the workload goal was met and a "yes" is returned.

In another example, the API 118 for the container 110 (or the API 128 for container 120) tracks a number of social network posts that are analyzed per minute. For a workload goal of 1000 posts analyzed per minute, if the number of social network posts analyzed is less than 1000, then the workload goal is not met and a "no" is returned. If, however, the number of social network posts analyzed is greater than or equal to 1000, then the workload goal is met and a "yes" is returned.

The workload requirement 111 includes performance data 112, a service level agreement 114, and runtime workload data 116. According to the examples above, the performance data 112 may include CPU usage, CPU delays, cache misses, etc. The service level agreement 114 contains the "goal" (e.g., a requirement for average queue time, a requirement for a total number of social posts analyzed per minute, etc.). The runtime workload data 116 includes data regarding the workload during runtime such as average queue time or a number of social posts analyzed per minute.

Similarly, the workload requirement 121 includes performance data 122, a service level agreement 124, and runtime workload data 126. According to the examples above, the performance data 122 may include a CPU usage, CPU delays, cache misses, etc. The service level agreement 124 contains the "goal" (e.g., a requirement for average queue time, a requirement for a total number of social posts analyzed per minute, etc.). The runtime workload data 126 includes data regarding the workload during runtime such as average queue time or a number of social posts analyzed per minute.

In an example, a container (e.g., the container 110) can be defined and created by a user on the user's local workstation or defined in a cloud infrastructure (e.g., IBM Bluemix or Amazon Web Services). The container 110 contains the workload, a feature that collects or measures performance data, a feature that describes the SLA, and a feature that collects runtime workload data. These features can be implemented as independent applications, as a single application, as scripts that calls existing tools on a system (e.g., the vmstats command on the Linux operating system), and/or a definition with a list of tools that can return the performance data. These features can be made available externally through or translated to map to one or more APIs. The APIs can be defined by the target executing environments or some open standards. After the container is completely defined, the user can deploy the container to a target executing environment such as the cloud (e.g., IBM Bluemix environment).

In another example, a container 110 can contain an application for digital photo processing. The application itself can track the rate of photo processing (i.e., a number of photos processed over a period of time), and the rate of photo processing can be criteria to compare with a goal. The application can contain a goal using a hardcoded value for the number of expected photos process per second. This goal, the rate of photo processing can be made available externally through or translated to map to the APIs 118. In this example, other data specific to the workload, including queue time, average processor consumed per photo, photo size, type of photo, etc., can also be measured by the application itself. These information can also be made available externally through one of the API 118.

In another example, the workload running in the container 110 can call an API within the container 110, and provide the service level achievement measure as part of workload metadata, goal, runtime workload data. These data are retrievable from the API 118 from outside of the container 118.

In another example, the workload running in the container 110 can append the runtime workload data to a file on the filesystem. When API 118 is called from outside of the container, API 118 retrieves the newly added information from the file on the filesystem.

In another example, the APIs can be system calls between an operating system and a hypervisor, and the workload-to-hardware adapter 106 can retrieve the workload requirements from the hypervisor. The cloud infrastructure can provide a base virtual server. The user of the container 110 defined the data to be sent from the operating system to the hypervisor and setup/install the workload on the container.

In another example, the APIs can be REST APIs (Representational State Transfer APIs) hosted on a web server running within the container 110. The cloud infrastructure can provide a base docker container image that contains the web server, and the user of the container 110 defines the data to be made available through the REST APIs.

In an example following the above, the cloud infrastructure can provide a configurable base container. The cloud infrastructure can provide a list of features to the user, and the user can select the desired features before the base container is created and deployed. Upon the creation of container, these features are automatically feed collected data to the APIs.

The API 118 (and/or API 128) sends the performance data to the workload-to-hardware adapter 106, which stores the performance data as a behavior. In examples, the workload-to-hardware adapter 106 determines a workload pattern. An example of a workload pattern may be a periodic increase of processing demand, a periodic increasing in queue time, a decrease in response time, etc.

The workload-to-hardware adapter 106 then determines whether the runtime workload data matches the goal set forth in the SLA (i.e., it is determined whether the goal is satisfied). The workload-to-hardware adapter 106 may trigger software defined environment (SDE) manager 130 to initiate a performance adjustment to adjust resources of the processing system based on the runtime workload data 116, 126 and the resources available. Resources that may be adjusted include general purpose processing units (GPUs) 102, 103, special purpose processing units (SPUs) 104, 105, storage devices 132, 134, a memory (not shown), virtual networks 140a, 140b, 140c, and/or other resources. The functions of the SDE manager 130 and the performance adjustment are described in more detail in FIG. 2 and FIG. 3 below.

In some examples, the APIs 118, 128 can be a push or pull and may serve as a feedback loop regarding level of effectiveness for the resource adjustment. For example, the APIs 118, 128 provide an index of whether the goal is met. The index can be a number, for example, between 0% and 100%, where 100% means the goal is fully met, 120% means the goal is exceeded, and 80% means the actual value is closer to the goal compared to 50%. In another example, the APIs 118, 128 provide a measurement of the amount of work being processed (e.g., light, medium, heavy, a number from 1-10, etc.). The APIs 118, 128 can also provide a runtime CPU usage, a CPU delay, an amount of CPU consumed, etc.

In some embodiment, the APIs 118, 128 send the runtime workload data to other external consumers. The runtime workload data could contain application logs or traces, transaction rate, first failure data capture, workload anomaly, workload health information, etc. The external consumer could be a monitoring, reporting, and/or chargeback facility provided by the target execution environment such as a cloud infrastructure. Example of chargeback facility can implement a change for every 10 photos processed at average response time of 10 photos per second, a lower change for every 10 photos processed at average response time of 10 photos per 2 seconds. It should be appreciated that this charge back mechanism is not based on physical resource utilization and utilizes an understanding of the runtime workload data.

In some example, the APIs 118, 128 send the workload requirement to the workload-to-hardware adapter 106. The workload-to-hardware adapter 106 determines whether the goal is met by comparing the service level agreement and the runtime performance data retrieved from APIs 118, 128. For example, the service level agreement might specify a goal of 500 ms response time, and the runtime performance data might show an average response time of 400 ms, transaction count within a range of 5000-7000, CPU delay of 100, cache missing of 500 for the last 10 seconds. The workload-to-hardware adapter 106 can determine the achievement level of the goal (i.e., how well the goal is met) and map that to the runtime performance data for this achievement level of the goal.

In an example, the API definition can specify the type of data and measurement unit that a workload container (e.g., the containers 110, 120) should return. For example, the API 118, 128 can allow three types of goals: response time, queue time, and transaction rate. The containers 110, 120 return the goal and runtime workload performance using seconds as the unit.

In another example, the API definition can allow unit agnostic goal and workload performance. For example, the API can return a unit of 5 for current performance, with a SLA goal of 7. One implementation would be returning the data in JSON format, for example: [{"Goal1":"7", "Goal_Achievement_Level":"80%"}, {"Goal2":"9", "Goal_Achievement_Level":"110%"}]. In this implementation, the workload-to-hardware adapter 106 can store these unit agnostic goals together with processor utilization measured by the container, hypervisor delay measured outside of the container.

In another example, the workload requirement could specify a goal, the outside of container data utilized to determine the service level achievement measure, and a formula to determine the service level achievement measure. In this example, the workload-to-hardware adapter 106 initiates the measurement, collection, or generation of the outside of container data required to determine the service level achievement measure. The formula to determine the service level achievement measure can be provided as script, compiled code, a specific language defined by the API, etc. In this example, the service level achievement measure is not provided by the container.

In another example, multiple service level achievement measures might be available. Some of the service level achievement measures can be provided by the container as container metadata, while some other service level achievement measures can be determined outside of the container. The multiple service level achievements can be assigned a priority. For example, one of the service level achievement measures can be provided by the container based on response time. An additional service level achievement measure can be determined outside of the container based on the cost of operation specified by the service level agreement provided by the container. The cost of operation can have higher priority compared to the response time based service level achievement measure, and the software defined environment manager may sacrifice response time to stay within the cost requirement.

The containers 110, 120 may be implemented on the processing system 100 such that the containers utilize the physical resources (i.e., GPU 102, GPU 103, SPU 104, SPU 105, etc.) to execute workloads. The containers may communicate via virtual networks, such as virtual networks 140a, 140b, 140c. In the example of FIG. 1, the container 110 communicates via the virtual networks 140b and 140c while the container 140 communicates via the virtual network 140a.

Figure 2:
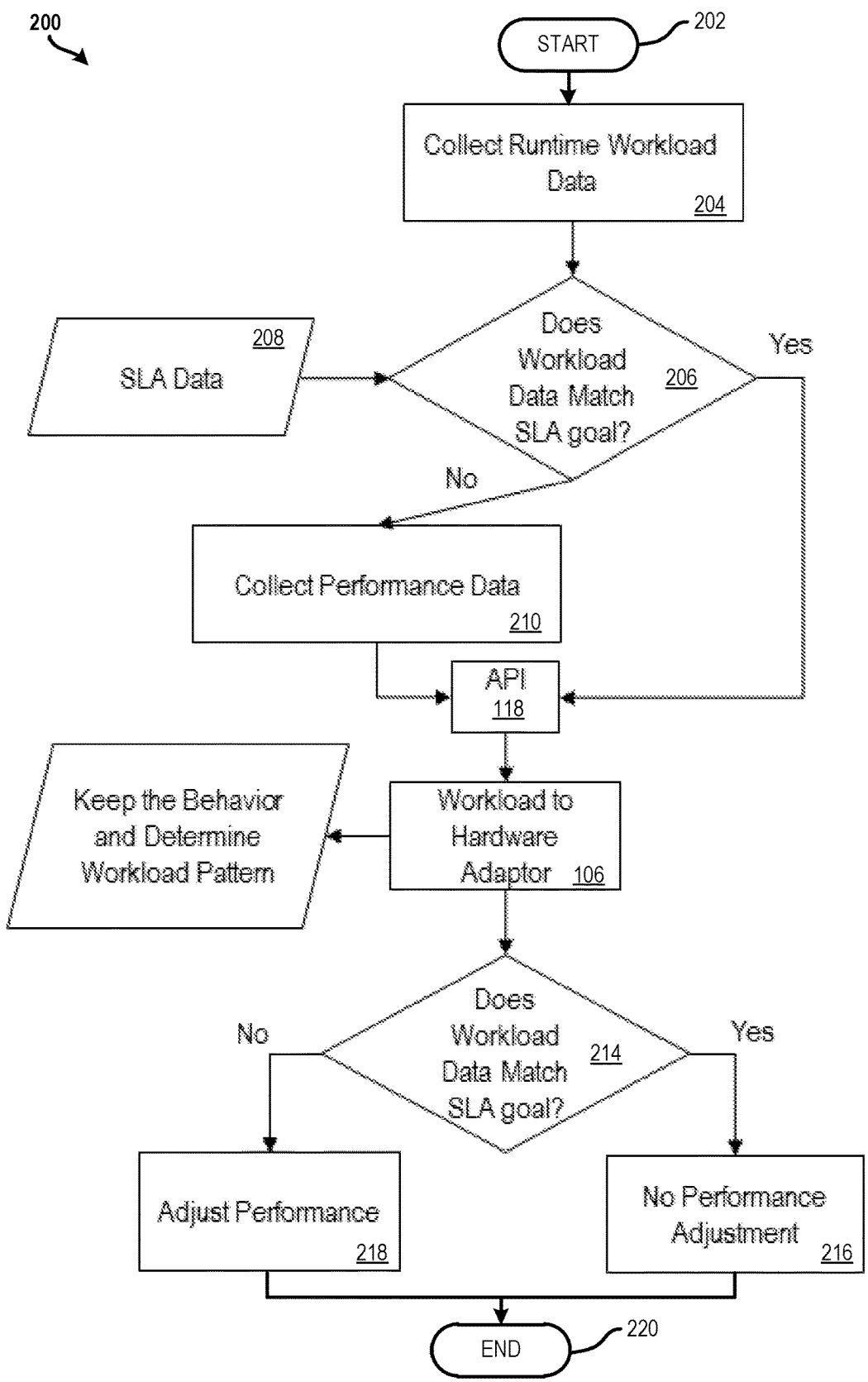
FIG. 2 illustrates a flow diagram of a method for managing workload distribution among processing systems based on field programmable devices according to examples of the present disclosure.

FIG. 2 illustrates a flow diagram of a method 200 for managing workload distribution among processing systems based on field programmable devices according to examples of the present disclosure. The method 200 may be performed, for example, by the processing system 100, by the processing system 20 of FIG. 5, or by another suitable processing system. The method 200 starts at block 202 and continues to block 204.

At block 204, the method 200 collects runtime workload data. The performance workload data may include various data regarding the workload during runtime, such as average queue time, average response time, etc. In some examples, the collection of runtime workload data is iterative and periodic in that runtime workload data is periodically collected.

At decision block 206, the method 200 determines whether the runtime workload data matches a goal set forth in an SLA (i.e., received from SLA data at block 208). In other words, it is determined whether the goal is satisfied based on the runtime workload data. For example, if a goal queue time is less than 15 seconds, the goal is satisfied when the runtime workload data indicates that the queue time is less than 15 seconds and the goal is not satisfied if the queue time is not less than 15 second.

When the goal is satisfied at decision block 206, the method 200 sends an indication to an API (e.g., API 118 of FIG. 1) that the goal is satisfied. However, when the goal is not satisfied, the method continues to block 210 and performance data is collected. Performance data may include CPU usage, CPU delays, cache misses, and the like.

The API 118 sends the performance data to the workload-to-hardware adapter (e.g., workload-to-hardware adapter 106 of FIG. 1), which stores the performance data as a behavior and, from the data, determines a workload pattern. An example of a workload pattern may be a periodic increase of processing demand, a periodic increasing in queue time, a decrease in response time, etc.

In an alternate embodiment, block 210 can collect performance data whether the workload data match the SLA goal or whether the workload data does not match the SLA goal. This performance data can be retrieved from API 118, 128, together with the SLA goal and runtime workload data. When the API 118,128 sends the performance data to the work-to-hardware adaptor 106, the performance data for different level of goal achievement (i.e., both meeting and missing goal) can be kept to determine workload pattern.

In another alternate embodiment, the workload-to-hardware adaptor 106 can collect performance data outside of the container 110, 120. For example, a container of a virtual server can be configured with 50% of each of the two physical processors of the processing system 100, where each of the physical processors can handle two billion instructions per second. Within the virtual server container, the workload has two virtual processors. When each of the virtual processors is 100% consumed, it will have processed one billion instructions per second (i.e. 50% of the physical processors). In another example, when a virtual processor is 30% consumed, it means the container has consumed 15% of the physical processor. The 15% utilization of the physical processor by the container can be collected by the workload-to-hardware adaptor 106 using performance data collected from the hypervisor (i.e., outside of the container). The workload-to-hardware adaptor 106 can store these performance data outside of the container s110, 120 as a behavior and can determine a workload pattern accordingly.

In another example following the above, outside of container processor utilization can be projected based on the performance data within the container 110, 120. For example, if it is known that 50% of the physical processor is given to the container as a virtual processor, then, by knowing the processor utilization within the container is 30%, the workload-to-hardware adaptor 106 can project the physical processor utilization to be 15%. In this example, the workload-to-hardware adaptor 106 converts the workload container view of performance data into actual hardware utilization or outside of container utilization (without measuring the physical processor utilization at the hypervisor). Similarly, the other data within workload requirement can be converted by the workload-to-hardware adapter. This can further facilitate the comparison or tradeoff between multiple workload containers based on the workload requirement (e.g., runtime workload data, performance data, SLA, etc.) collected by the workload containers.

In another example, the hypervisor delay is another metric that can be collected outsider of the container 110, 120. Hypervisor delay is a measurement of delay in virtual server needing to consume physical resources but is unable to do so. The hypervisor delay can be measured using periodic sampling. For example, at the hypervisor, the current state of a virtual server can be determined once every 100 milliseconds. The state includes information such as "currently has work, and waiting for processor", "currently does not have work", and "currently has work, and running on a processor." In this example, the sampled hypervisor delay cannot be converted by the workload-to-hardware adapter 106, and will be measured and collected by the workload-to-hardware adapter 106 outside of the container.

The workload-to-hardware adapter 106 then determines, at decision block 214, whether the runtime workload data matches the goal set forth in the SLA (i.e., it is determined whether the goal is satisfied). If it is determined that the goal is satisfied at decision block 214, the method 200 continues to block 216 and no performance adjustment occurs. The method 200 then continues to block 220 and ends. This workload-to-hardware adapter 106 can solely determine whether the goal is satisfied using information provided by API 118.

In an example, the SLA can have goals specified from the container's point of view or from the physical resource's point of view. In other examples, the SLA can specify goals resource agnostically. For example, a goal within the container's point of view can be defined as 80% processor utilization of the container. In another example, a goal within the physical resource's point of view can be defined as two physical processors in their entirety or 30% processor delay. In another example, resource agnostic goals can be defined based on queue time, response time, or other measurements that do not directly relate to the physical or virtual resources.

In another embodiment, the workload-to-hardware adapter 106 can partially utilize information provided by API 118 and data collected outside of the container 110. In other words, the SLA can have goals specified by a combination of inside the container workload runtime data and outside of the container performance data. For example, the SLA can have goals specified by a combination of a goal of 80% processor utilization within the container, and running on at most 50% of the five physical processors. In this example, block 206 and API 118 could provide a measured processor utilization within the container 110, a first goal for the processor utilization within the container, a first goal achievement index for the processor utilization within the container, and a second goal for the physical processor utilization (outside of the container). The workload-to-hardware adapter 106 uses the outside of container physical processor utilization and the second goal provided by the API to determine the second service level achievement measure of the second goal.

In an example following the above, the second goal could be a factor created based on cost of operation, and therefore, when a tradeoff is needed between first goal and second goal, the second goal might be treated as a "must meet" goal.

In another example following the above, the second goal could be defined by cost directly. For example, the second goal can be defined as $1,000 per month. The workload-to-hardware adapter 106 converts the goal of $1,000 per month to the amount of physical resources to assign to the container. For example, if $1,000 per month translates to 50% of 4 processors. If over the first half of the month, the container has only consumed 25% of 4 processors, the container can potentially utilize up to 75% of 4 processors in the second half of the month and still met the second goal.

If, however, it is determined that the goal is not satisfied at decision block 214, then the performance (e.g., of the processing system 100 of FIG. 1) is adjusted at block 218. Examples of performance adjustments are described below with respect to FIG. 3. The method 200 then continues to block 220 and ends.

Additional processes also may be included, and it should be understood that the processes depicted in FIG. 2 represent illustrations, and that other processes may be added or existing processes may be removed, modified, or rearranged without departing from the scope and spirit of the present disclosure.

Figure 3:
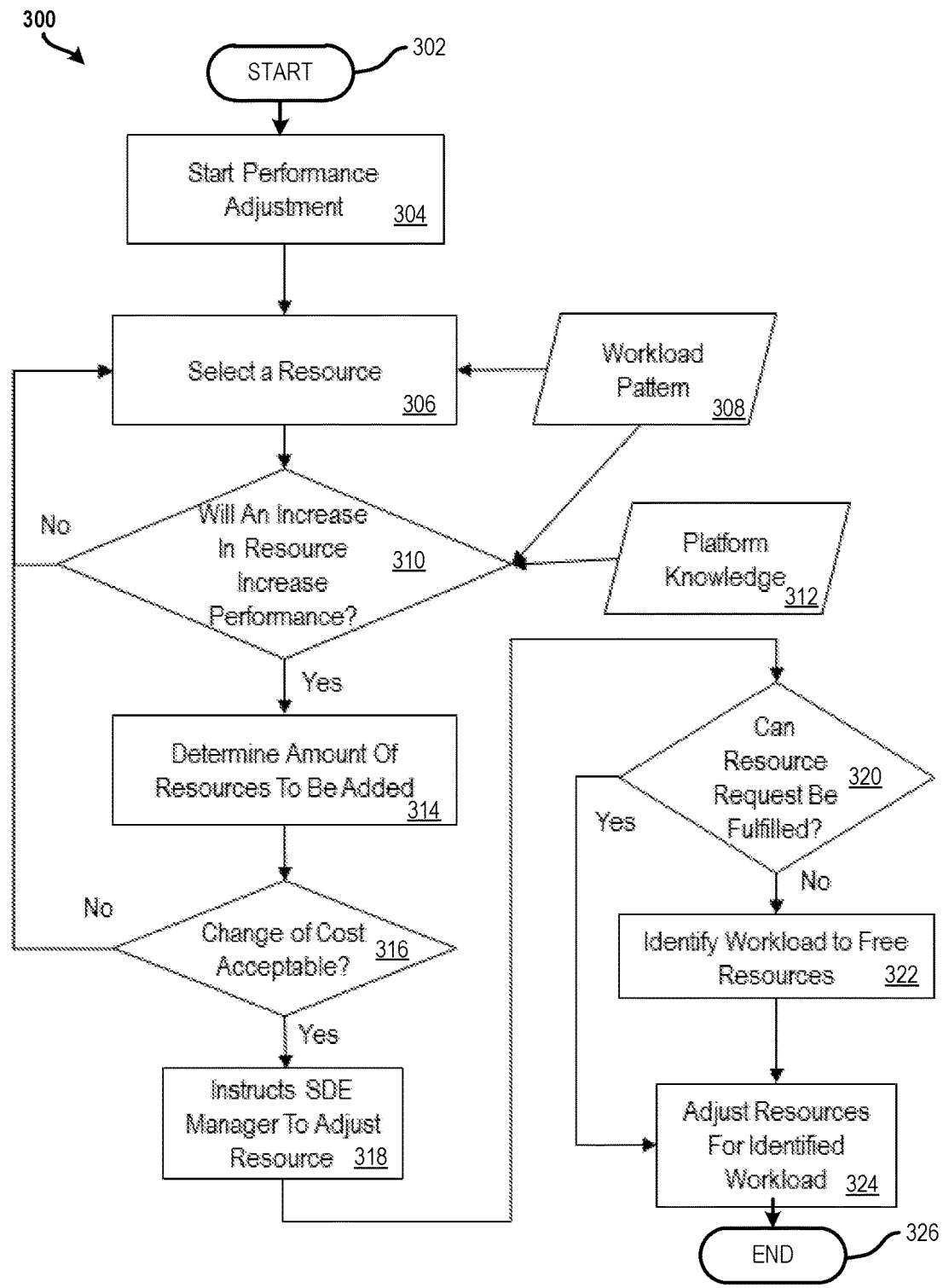
FIG. 3 illustrates a flow diagram of a method for performing a performance adjustment according to aspects of the present disclosure.

FIG. 3 illustrates a flow diagram of a method 300 for performing a performance adjustment according to aspects of the present disclosure. The method 300 may be performed, for example, by the processing system 100, by the processing system 20 of FIG. 5, or by another suitable processing system. The method 300 starts at block 302 and continues to block 304.

At block 304, the method 300 starts a performance adjustment, which may be initiated in response to a determination that an SLA goal is not satisfied at decision block 214 of FIG. 2, or the workload is performing better than the SLA goal.

At block 306, a resource is selected. Examples of resources include a CPU, a concurrent CPU delay, a processing thread, a memory, a network, a storage device, etc. The resource may be selected using a workload pattern 308 that may indicate information about the resource (e.g., a periodic increase of processing demand, etc.).

At decision block 310, the method 300 determines whether an increase in the resource will increase performance for the processing system (e.g., the processing system 100 of FIG. 1). The determination may be based on the workload pattern 308 and/or platform knowledge 312 (e.g., a CPU delay, paging space utilization, etc.).

If the increase in resource will not increase performance, the method returns to block 306 and another resource is selected. In one example, if a CPU is used less than an available CPU and a CPU delay is nearly 9, then adjusting the CPU will not help. If, however, the increase in resource will increase performance, the method 300 continues to block 314. In one example, if a CPU used is more than an available CPU and a CPU delay is too large (e.g., larger than a SLA goal), then adjusting a CPU may help.

At block 314, it is determined what amount of resource is to be added. In examples, this may include determining an amount of memory, a number of processors to make available, etc.

At decision block 316, the method 300 includes determining whether the change of cost is acceptable. For example, the increase in resources may incur additional user costs. If an additional processor (CPU) is enabled, the user may be charged an additional amount. If the cost is not acceptable, the method 300 returns to block 306 and another resource is selected. If, however, the cost is acceptable, the method 300 continues to block 318 and the software defined environment manager (e.g., software defined manager 130 is instructed to adjust the resource.

At decision block 320, the method 300 determines whether the resource can be fulfilled. Such a determination may be based on the availability of resources. For example, if it is determined to add a CPU, but all of the CPUs are unavailable or otherwise being used, then the resource request cannot be fulfilled. In this case, the method 300 proceeds to block 322 and identifies a workload to free up resources. For example, a workload may be stopped or reallocated to free up a CPU or other resource. The method 300 then adjusts the resources for the identified workload at block 324 to complete the performance adjustment. The method 300 continues to block 326 and ends.

Additional processes also may be included, and it should be understood that the processes depicted in FIG. 3 represent illustrations, and that other processes may be added or existing processes may be removed, modified, or rearranged without departing from the scope and spirit of the present disclosure.

Figure 4:
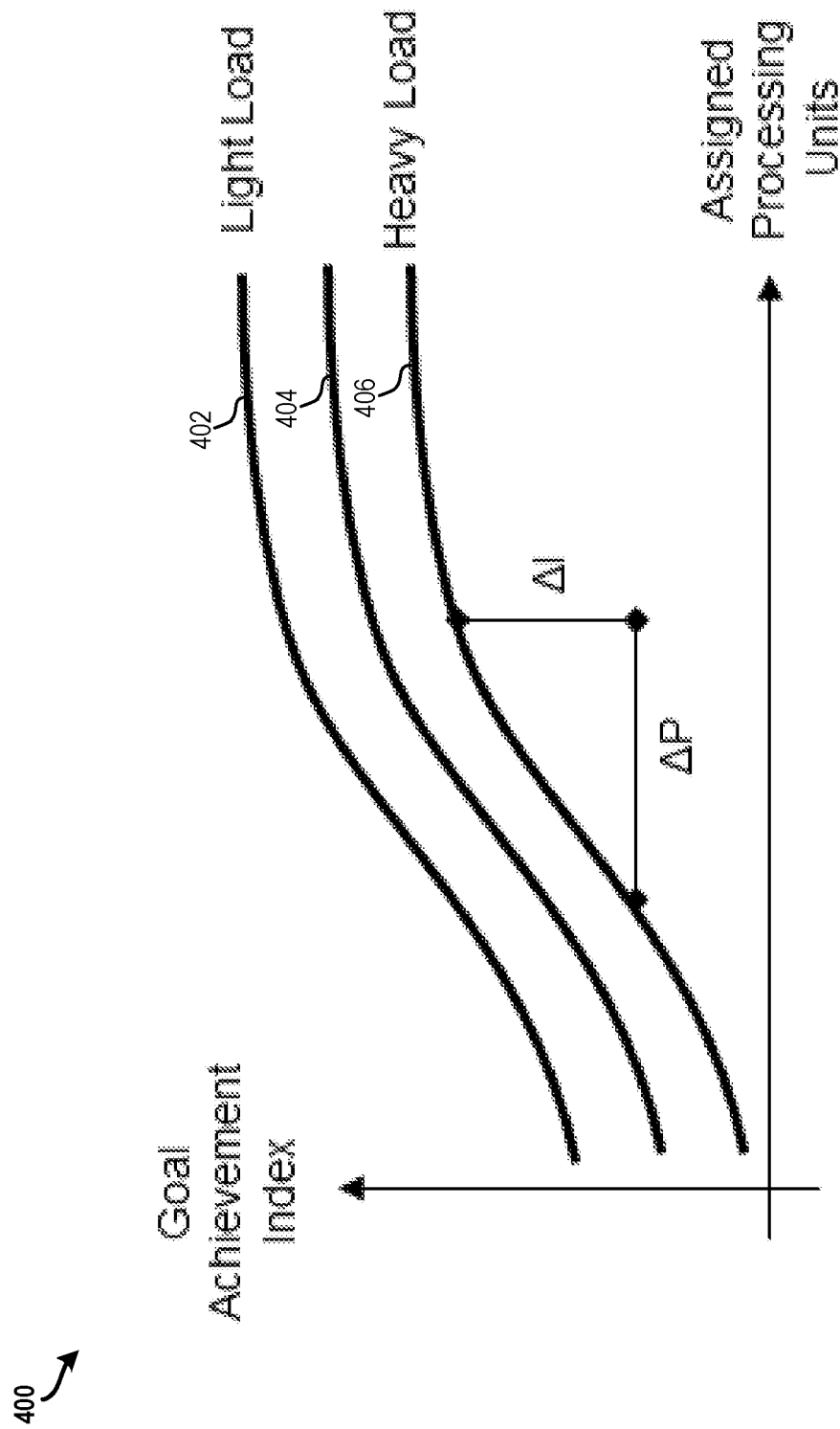
FIG. 4 illustrates a graph of resource action effectiveness according to aspects of the present disclosure.

FIG. 4 illustrates a graph 400 of resource action effectiveness according to aspects of the present disclosure. In particular, the graph 400 plots a number of assigned processing units versus a goal achievement index, which represents goals established in an SLA.

In particular, the graph 400 illustrates three different loads: light load 402, nominal load 404, and heavy load 406. An effectiveness of a resource adjustment action can be calculated as an amount of goal achievement index change over time ($\Delta I$) divided by an amount of processor change over time ($\Delta P$). The larger the number is, the more effective a performance change is. Thus, in the graph 400 of FIG. 4, as the number of assigned processing units increases, the loads 402, 404, 406 increase, which indicates an effective change.

The graph 400 can help estimate how much adjustment is useful to accomplish a specific goal. In examples, the graph 400 can apply from one system with sufficient data to another system that does not have enough data.

In an example, the workload pattern can correlate or plot performance data from outside of the container, workload requirement data retrieved from an API, and platform knowledge over time. For example, it is possible to generate the following data: (transaction rate=500 per second, physical processor utilization=50%, response time=100 milliseconds), (transaction rate=600 per second, physical processor utilization=60%, response time=100 milliseconds), (transaction rate=700 per second, physical processor utilization=70%, response time=100 milliseconds), (transaction rate=700 per second, physical processor utilization=50%, response time=110 milliseconds), (transaction rate=600 per second, physical processor utilization=50%, response time=120 milliseconds). If the transaction rate increases to 800 per second, in order to keep a SLA goal of 100 millisecond, it can be projected using linear regression or other statistical approaches that the physical processor needs to increase to 80%. If the transaction increased to 800 per seconds, and if the processor utilization stays at 50%, it can be projected using curve fitting techniques or other statistical approaches that the response time will be 140 milliseconds.

In an example following the above, the increase of physical processor to 80% might increase the cost from $1,000 per month to $1,200 per month. The increase of cost can be verified against the SLA, and the appropriate tradeoff between response time increase and cost increase can be made.

In another example, the relationship between the data in the workload requirement and performance data outside of the container can have a multi-to-multi relationship. For example, response time and queue time can depend on multiple factors including hypervisor delay, processor utilization, and transaction rate. The projection of response time can be done using technique such as multi-variable regression analysis, least square analysis, etc.

In another example, there can be more data collected to compare to what is needed for projection. The interdependency of data (e.g., whether response time is affected by I/O paging rate, etc.) can be determined dynamically using statistics or data mining techniques such as clustering, linear regression, etc. In addition, the statistics or data mining techniques can also be determined dynamically. The interdependency of data and the appropriate statistics or data mining technique can be reevaluated periodically as more data are collected about the workload. Once the interdependency of data is determined, projection of the data can be performed.

According to embodiments of the present disclosure, for the same workload, it may be determined that a specific type of resource adjustment is effective for the workload to make reasonable impact to the SLA goal. For example, it can be determined that a processor increase of 10% will improve response time by 0.01%, while a 50% processor increase will improve response time by 0.1%. Due to workload variability, a 0.01% improvement in response time is very difficult to distinguish from noise. The adjustment that reasonably impact the SLA goal is therefore a 50% processor increase. Then, using that knowledge, the type of resource adjustment may be prioritized for the same workload running on a different processing system.

In another embodiment, the container 110 (or the container 120) on processing system 100 can be moved to a second processing system. The behavior and workload pattern, platform knowledge collected by the workload-to-hardware container is also moved to the second processing system. During the move of container 110, the behavior and workload pattern and the platform knowledge can be converted from the point of view of processing system 100 to the point of view of second processing system. In an example, the second processing system is half as capable as processing system 100 (e.g., the processing system 100 can process 2 billion instructions per second while the second processing system can process 1 billion instructions per second). In this example, if the behavior and workload pattern on processing system 100 indicates 25% utilization of a physical processor, then the processor utilization is translated to 50% utilization of a physical processor.

Figure 5:
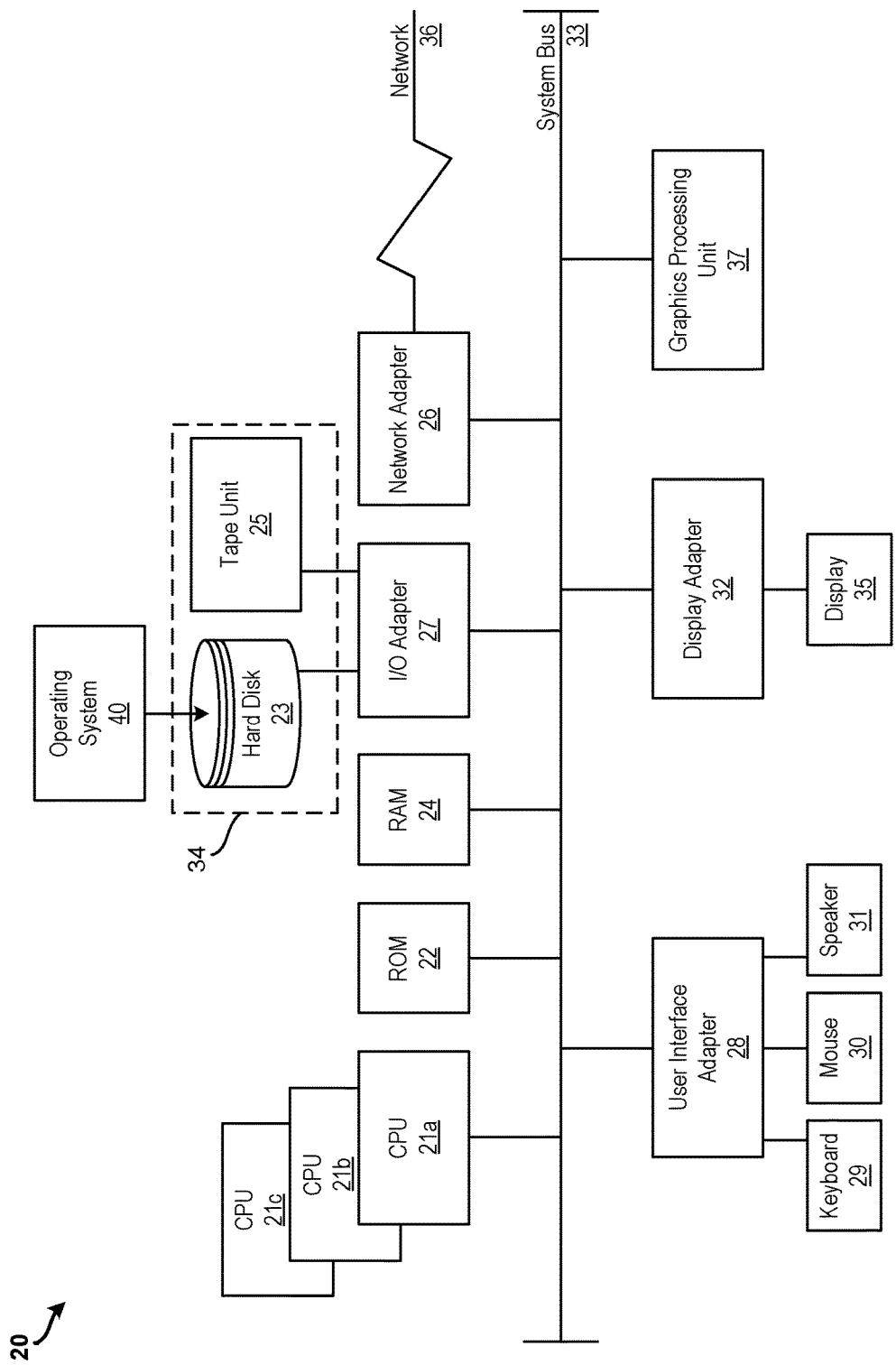
FIG. 5 illustrates a block diagram of a processing system for implementing the techniques described herein according to examples of the present disclosure.

It is understood in advance that the present disclosure is capable of being implemented in conjunction with any other type of computing environment now known or later developed. For example, FIG. 5 illustrates a block diagram of a processing system 20 for implementing the techniques described herein. In examples, processing system 20 has one or more central processing units (processors) 21a, 21b, 21c, etc. (collectively or generically referred to as processor(s) 21 and/or as processing device(s)). In aspects of the present disclosure, each processor 21 may include a reduced instruction set computer (RISC) microprocessor. Processors 21 are coupled to system memory (e.g., random access memory (RAM) 24) and various other components via a system bus 33. Read only memory (ROM) 22 is coupled to system bus 33 and may include a basic input/output system (BIOS), which controls certain basic functions of processing system 20.

Further illustrated are an input/output (I/O) adapter 27 and a communications adapter 26 coupled to system bus 33. I/O adapter 27 may be a small computer system interface (SCSI) adapter that communicates with a hard disk 23 and/or a tape storage drive 25 or any other similar component. I/O adapter 27, hard disk 23, and tape storage device 25 are collectively referred to herein as mass storage 34. Operating system 40 for execution on processing system 20 may be stored in mass storage 34. A network adapter 26 interconnects system bus 33 with an outside network 36 enabling processing system 20 to communicate with other such systems.

A display (e.g., a display monitor) 35 is connected to system bus 33 by display adaptor 32, which may include a graphics adapter to improve the performance of graphics intensive applications and a video controller. In one aspect of the present disclosure, adapters 26, 27, and/or 32 may be connected to one or more I/O busses that are connected to system bus 33 via an intermediate bus bridge (not shown). Suitable I/O buses for connecting peripheral devices such as hard disk controllers, network adapters, and graphics adapters typically include common protocols, such as the Peripheral Component Interconnect (PCI). Additional input/output devices are shown as connected to system bus 33 via user interface adapter 28 and display adapter 32. A keyboard 29, mouse 30, and speaker 31 may be interconnected to system bus 33 via user interface adapter 28, which may include, for example, a Super I/O chip integrating multiple device adapters into a single integrated circuit.

In some aspects of the present disclosure, processing system 20 includes a graphics processing unit 37. Graphics processing unit 37 is a specialized electronic circuit designed to manipulate and alter memory to accelerate the creation of images in a frame buffer intended for output to a display. In general, graphics processing unit 37 is very efficient at manipulating computer graphics and image processing, and has a highly parallel structure that makes it more effective than general-purpose CPUs for algorithms where processing of large blocks of data is done in parallel.

Thus, as configured herein, processing system 20 includes processing capability in the form of processors 21, storage capability including system memory (e.g., RAM 24), and mass storage 34, input means such as keyboard 29 and mouse 30, and output capability including speaker 31 and display 35. In some aspects of the present disclosure, a portion of system memory (e.g., RAM 24) and mass storage 34 collectively store an operating system such as the AIX® operating system from IBM Corporation to coordinate the functions of the various components shown in processing system 20.

In other examples, the present disclosure may be implemented on cloud computing. Cloud computing is a model of service delivery for enabling convenient, on-demand network access to a shared pool of configurable computing resources (e.g. networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure comprising a network of interconnected nodes.

Figure 6:
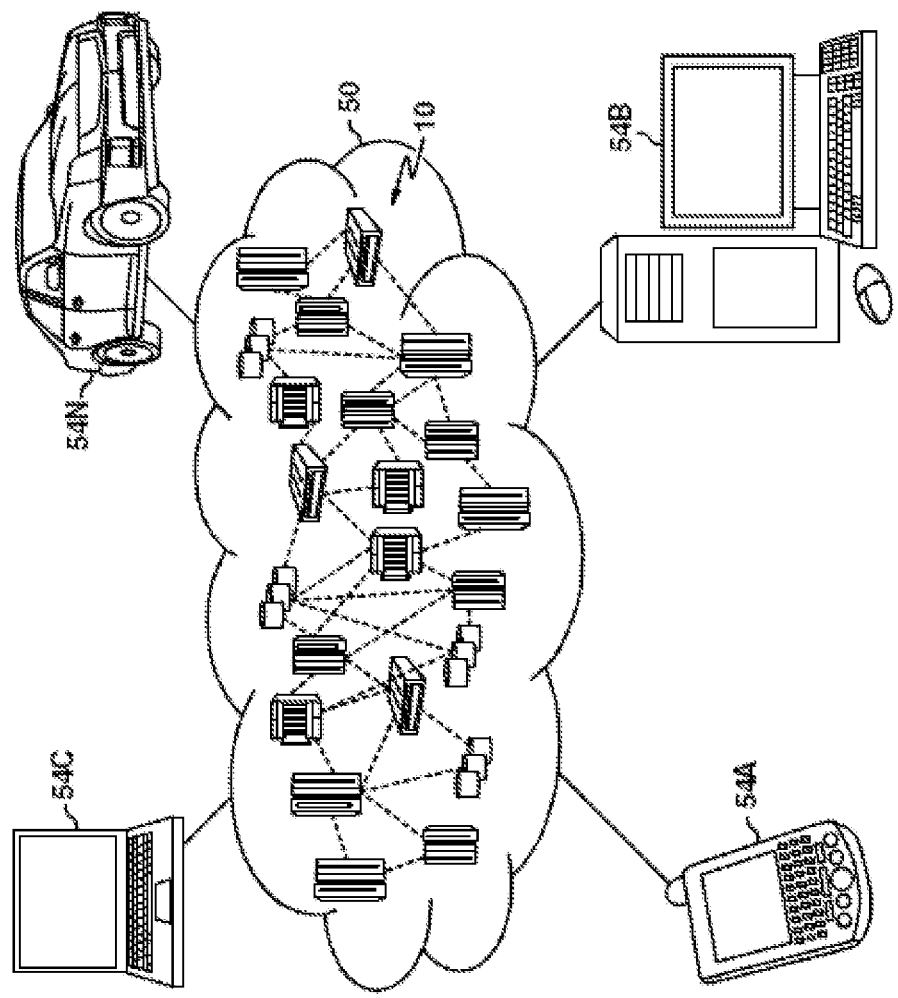
FIG. 6 illustrates a cloud computing environment according to examples of the present disclosure.

Referring now to FIG. 6, illustrative cloud computing environment 50 is illustrated. As shown, cloud computing environment 50 comprises one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 6 are intended to be illustrative only and that computing nodes 10 and cloud computing environment 50 can communicate with any type of computerized device over any type of network and/or network addressable connection (e.g., using a web browser).

Figure 7:
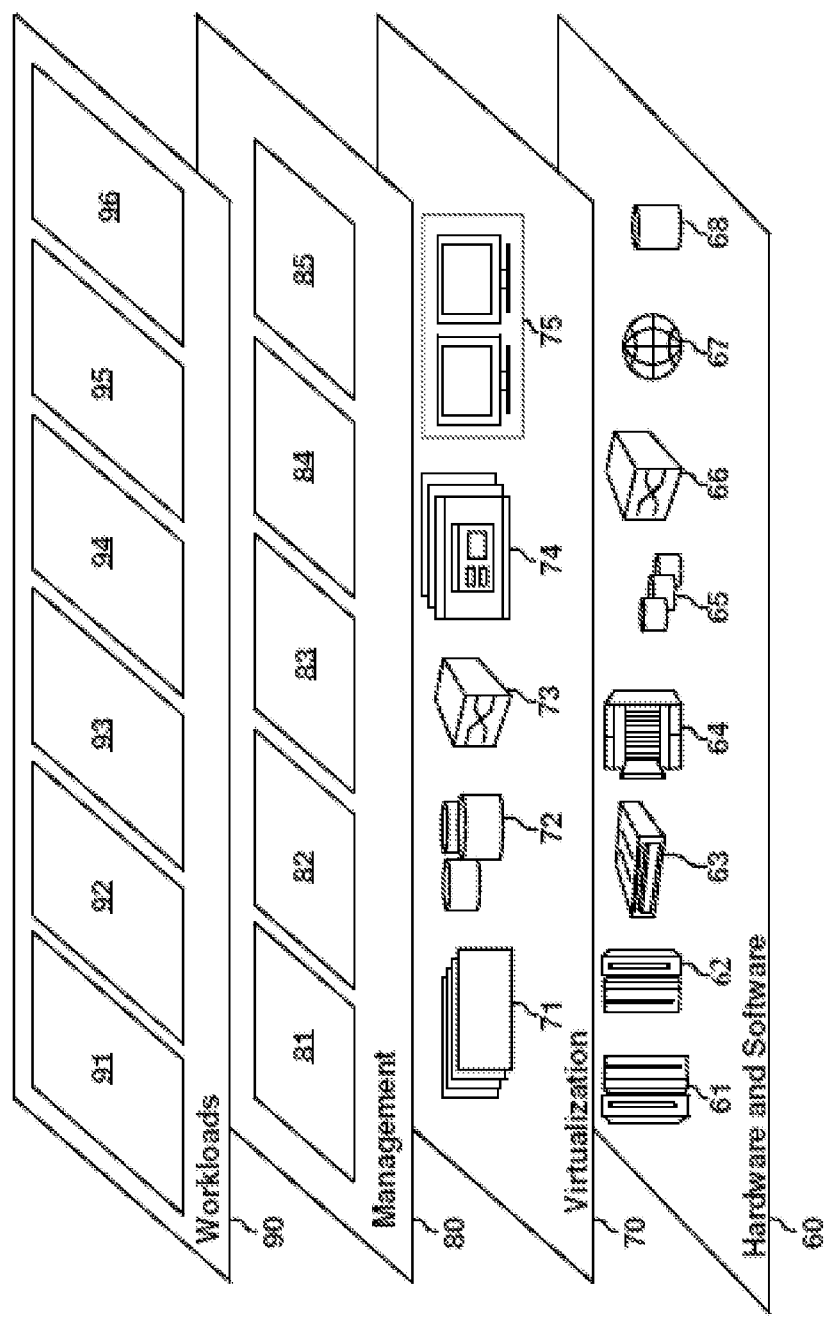
FIG. 7 illustrates abstraction model layers according to examples of the present disclosure.

Referring now to FIG. 7, a set of functional abstraction layers provided by cloud computing environment 50 (FIG. 6) is shown. It should be understood in advance that the components, layers, and functions shown in FIG. 7 are intended to be illustrative only and embodiments of the invention are not limited thereto. As illustrated, the following layers and corresponding functions are provided:

Hardware and software layer 60 includes hardware and software components. Examples of hardware components include: mainframes 61; RISC (Reduced Instruction Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources may comprise application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provides pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and service level management of a workload defined environment 96.

The present techniques may be implemented as a system, a method, and/or a computer program product. The computer program product may include a computer readable storage medium (or media) having computer readable program instructions thereon for causing a processor to carry out aspects of the present disclosure.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present disclosure may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some examples, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present disclosure.

Aspects of the present disclosure are described herein with reference to flowchart illustrations and/or block diagrams of methods, apparatus (systems), and computer program products according to aspects of the present disclosure. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the figures illustrate the architecture, functionality, and operation of possible implementations of systems, methods, and computer program products according to various aspects of the present disclosure. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various examples of the present disclosure have been presented for purposes of illustration, but are not intended to be exhaustive or limited to the embodiments disclosed. Many modifications and variations will be apparent to those of ordinary skill in the art without departing from the scope and spirit of the described techniques. The terminology used herein was chosen to best explain the principles of the present techniques, the practical application or technical improvement over technologies found in the marketplace, or to enable others of ordinary skill in the art to understand the techniques disclosed herein.

What is claimed is:

1. A computer-implemented method for service level management of a workload defined environment, the method comprising:
   collecting runtime workload data for a workload executing within a container;
   performing, by a processing device, a determination of whether the runtime workload data satisfies a goal set forth in a service level agreement;
   responsive to determining that the runtime workload data does not satisfy the goal, providing data from within the container in a format utilized by an application program interface; and
   accessing the data from within the container through the application program interface from outside of the container.

2. The computer-implemented method of claim 1, further comprising collecting performance data for the workload executing within the container, wherein the container makes the performance data, the runtime workload data, and the service level agreement available through the application program interface.

3. The computer-implemented method of claim 2, wherein the application program interface is defined as part of the container for a target execution environment.

4. The computer-implemented method of claim 1, wherein the data within the container are generated based on the workload.

5. The computer-implemented method of claim 4, wherein the data comprise at least one of a response time, a queue time, a processing rate, a workload complexity, a workload size, a unit agnostic metric, a service level achievement measure, a first failure data capture, an anomaly, and workload health.

6. The computer-implemented method of claim 1, wherein the data within the container are generated using standard features provided by the container.

7. The computer-implemented method of claim 1 wherein a workload defined subset of data within the container are available through the application program interface.

8. The computer-implemented method of claim 1, wherein the data from within the container are made available to the application program interface through a mechanism defined by the container.

9. A system for service level management of a workload defined environment, the system comprising:
   a memory having computer readable instructions; and
   a processing device for executing the computer readable instructions, the computer readable instructions comprising instructions for performing a method comprising:
      collecting runtime workload data for a workload executing within a container;
      performing, by the processing device, a determination of whether the runtime workload data satisfies a goal set forth in a service level agreement;
      responsive to determining that the runtime workload data does not satisfy the goal, providing data from within the container in a format utilized by an application program interface; and
      accessing the data from within the container through the application program interface from outside of the container.

10. The system of claim 9, wherein the method further comprises collecting performance data for the workload executing within the container, wherein the container makes the performance data, the runtime workload data, and the service level agreement available through an application program interface.

11. The system of claim 10, wherein the application program interface is defined as part of the container for a target execution environment.

12. The system of claim 9, wherein the data within the container are generated based on the workload.

13. The system of claim 12, wherein the data comprise at least one of a response time, a queue time, a processing rate, a workload complexity, a workload size, a unit agnostic metric, a service level achievement measure, a first failure data capture, an anomaly, and workload health.

14. The system of claim 9, wherein the data within the container are generated using standard features provided by the container.

15. The system of claim 9 wherein a workload defined subset of data within the container are available through the application program interface.

16. The system of claim 9, wherein the data from within the container are made available to the application program interface through a mechanism defined by the container.

17. A computer program product for service level management of a workload defined environment, the computer program product comprising:
   a computer readable storage medium having program instructions embodied therewith, wherein the computer readable storage medium is not a transitory signal per se, the program instructions executable by a processing device to cause the processing device to perform a method comprising:
      collecting runtime workload data for a workload executing within a container;
      performing, by the processing device, a determination of whether the runtime workload data satisfies a goal set forth in a service level agreement;
      responsive to determining that the runtime workload data does not satisfy the goal, providing data from within the container in a format utilized by an application program interface; and
      accessing the data from within the container through the application program interface from outside of the container.

18. The computer program product of claim 17, wherein the method further comprises collecting performance data for the workload executing within the container, wherein the container makes the performance data, the runtime workload data, and the service level agreement available through the application program interface.

19. The computer program product of claim 18, wherein the application program interface is defined as part of the container for a target execution environment.

20. The computer program product of claim 17, wherein the data within the container are generated based on the workload.

* * * * *